(12) United States Patent
Kezys

(10) Patent No.: US 8,289,941 B2
(45) Date of Patent: *Oct. 16, 2012

(54) VOICE SYNCHRONIZATION DURING CALL HANDOFF

(75) Inventor: Vytautas Robertas Kezys, Hamilton (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/938,648

(22) Filed: Nov. 3, 2010

(65) Prior Publication Data

US 2011/0044289 A1    Feb. 24, 2011

Related U.S. Application Data

(63) Continuation of application No. 11/428,561, filed on Jul. 4, 2006, now Pat. No. 7,852,815.

(60) Provisional application No. 60/696,223, filed on Jul. 5, 2005.

(51) Int. Cl.
*H04W 4/00* (2009.01)

(52) U.S. Cl. ........ 370/338; 370/331; 370/240; 370/330; 370/249; 370/329; 455/575.2; 455/450; 455/536; 455/550.1

(58) Field of Classification Search .............. 455/575.2, 455/450, 536, 550.1; 370/331, 240, 338, 370/249, 329, 330
See application file for complete search history.

(56) References Cited

U.S. PATENT DOCUMENTS

| | | | |
|---|---|---|---|
| 4,758,908 A | 7/1988 | James | |
| 5,828,659 A | 10/1998 | Teder et al. | |
| 6,178,165 B1 | 1/2001 | Sakamoto et al. | |
| 6,230,014 B1 | 5/2001 | Freeze et al. | |
| 6,738,916 B1 | 5/2004 | Gladden et al. | |
| 6,766,171 B2 | 7/2004 | Pan et al. | |
| 6,888,808 B2 | 5/2005 | Jagadeesan et al. | |
| 7,031,280 B2 | 4/2006 | Segal | |
| 2001/0036172 A1 | 11/2001 | Haskal | |
| 2001/0053144 A1 | 12/2001 | Leroy et al. | |
| 2002/0085516 A1 | 7/2002 | Bridgelall | |
| 2002/0167921 A1 | 11/2002 | Vakil et al. | |

(Continued)

FOREIGN PATENT DOCUMENTS

WO    007315 A1    2/2000

(Continued)

OTHER PUBLICATIONS

Huang, H. et al., Improving TCP Performance during Soft Vertical Handoff Proceedings of the 19th International Conference on Advanced Information Networking and Applications (AINA'05), vol. 2, Mar. 28-30, 2005, pp. 329-332. EPO, Extended European Search Report for Patent Application No. 09152945.3 1525, dated Apr. 7, 2009.

*Primary Examiner* — Rafael Pérez-Gutiérrez
*Assistant Examiner* — Joseph Arévalo
(74) *Attorney, Agent, or Firm* — Ridout & Maybee LLP

(57) ABSTRACT

A method, mobile electronic device and system for synchronizing hand-off of a voice media session between a WAN/cellular network and a WLAN network. When a hand-off occurs, the connection with both networks is temporarily maintained and the voice data on both connections compared to determine differences in the delays experienced over both connections. The timing of one or both voice streams is adjusted to synchronize the voice streams, and then the hand-off is completed.

17 Claims, 7 Drawing Sheets

U.S. PATENT DOCUMENTS

| | | |
|---|---|---|
| 2005/0254486 A1 | 11/2005 | Agarwal et al. |
| 2006/0025151 A1 | 2/2006 | Karaoguz et al. |
| 2006/0166715 A1* | 7/2006 | Van Engelen et al. ...... 455/575.2 |
| 2006/0166716 A1* | 7/2006 | Seshadri et al. ........... 455/575.2 |
| 2006/0183478 A1 | 8/2006 | Jagadeesan et al. |
| 2007/0008928 A1 | 1/2007 | Kezys |

FOREIGN PATENT DOCUMENTS

| | | |
|---|---|---|
| WO | 0028762 A1 | 5/2000 |
| WO | 0101614 A1 | 1/2001 |
| WO | 03088527 A1 | 10/2003 |
| WO | 2005051025 A1 | 6/2005 |

* cited by examiner

US 8,289,941 B2

VOICE SYNCHRONIZATION DURING CALL HANDOFF

CROSS-REFERENCE TO RELATED APPLICATIONS

The present application is a continuation application of U.S. patent application Ser. No. 11/428,561, filed Jul. 4, 2006. This application also claims priority to, and incorporates by reference, U.S. Patent Application No. 60/696,223 filed Jul. 5, 2005.

FIELD OF TECHNOLOGY

The present application relates to wireless communications, and in particular to voice synchronization during call handoff between two wireless networks.

BACKGROUND INFORMATION

Wireless local area networks (WLANs), such as those defined by the IEEE 802.11 standard, are becoming more common for enterprises such as businesses, universities, and other organizations in order to provide effective wireless coverage to a defined area. The WLANs function by having a large number of access points physically distributed throughout the coverage area and connected to a network. The WLAN may be further connected to other networks, including for example the Internet or the public switched telephone network. The WLAN allows users to freely move about an enterprise coverage area and use a mobile wireless device to engage in services, including real-time packet-based services such as VoIP, as the device connection is switched from access point to access point.

Enterprises are recognizing the advantages of wireless VoIP as a means of providing ready and secure access to persons within the enterprise coverage area while at the same time reducing the toll costs associated with traditional wide area network (WAN) cellular phones operated by third party providers.

WLANs will often have overlapping coverage areas with traditional cellular networks. Accordingly, there is a desire for a communications system in which voice calls can be handed-off between a cellular network and a WLAN with minimal effect on the quality of the voice call during handoff.

BRIEF DESCRIPTION OF THE DRAWINGS

Example embodiments will now be described, by way of example only, with reference to the attached Figures, wherein.

Like reference numerals are used throughout the Figures to denote similar elements and features.

DETAILED DESCRIPTION

Figure 1:
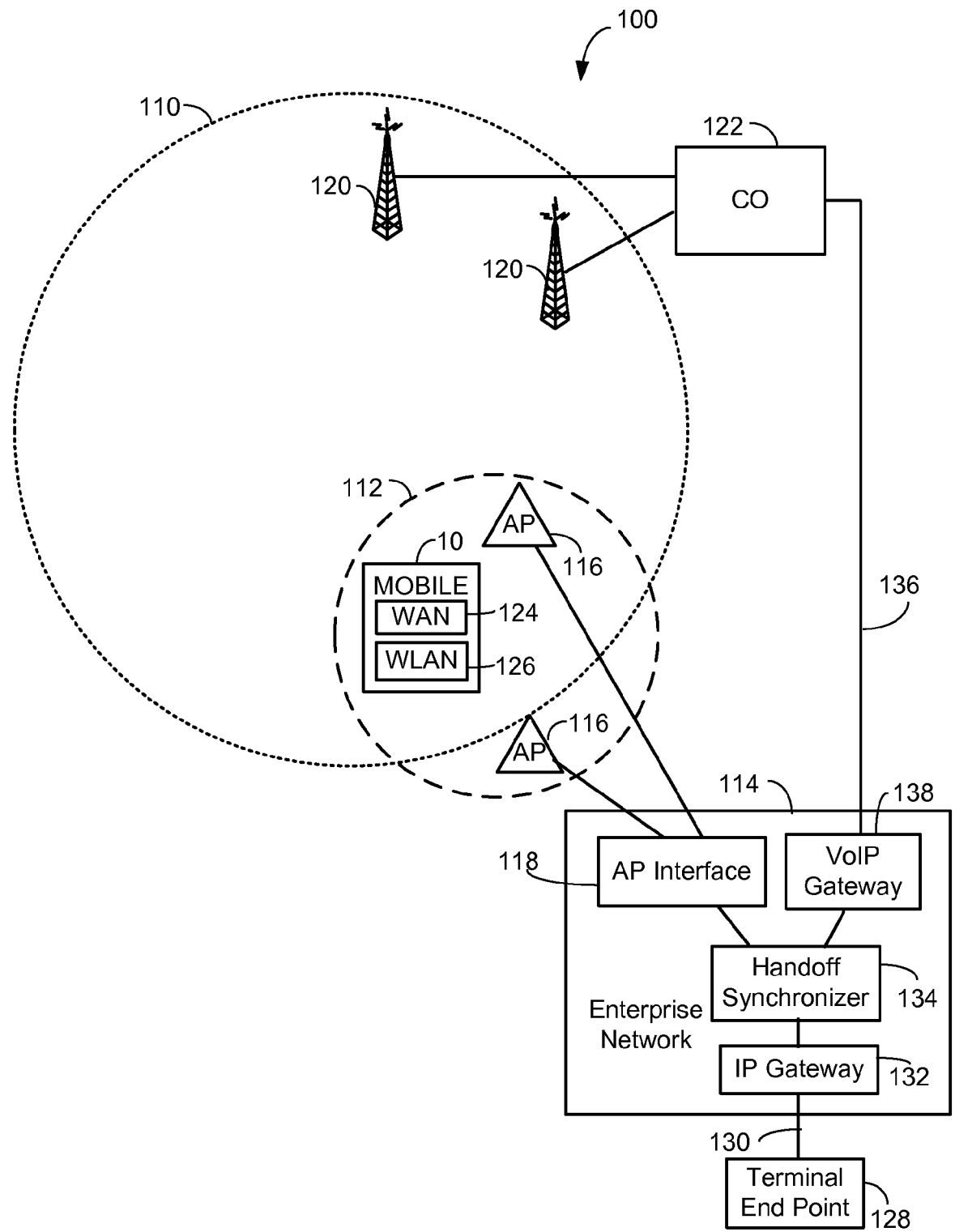
FIG. 1 is a block diagram of a communications system incorporating example embodiments.

Embodiments described in the present application comprise a method and system for hand-off of a voice media session between a WAN/cellular network and a WLAN network. When a hand-off occurs, the connection with both networks is temporarily maintained and the voice data on both connections compared to determine differences in the delays experienced over both connections. The timing of one or both voice streams is adjusted to synchronize the voice streams, and then the handoff is completed.

In one aspect, the present application describes a method for synchronizing during handoff of an in-progress call in a communications system that comprises a wireless wide area network (WAN) and a wireless local area network (WLAN) having at least partially overlapping coverage areas, a mobile device having a WAN communications subsystem for exchanging wireless voice data with the WAN and a WLAN communications subsystem for exchanging wireless voice data with the WLAN, wherein prior to handoff a communications path between the mobile device and a remote location comprises a first voice path through one of the WAN and the WLAN. The method comprises: establishing a second voice path between the mobile device and the remote location through the other one of the WAN and the WLAN; transmitting in parallel streams of identical voice data over the first and second voice paths; comparing the streams of voice data after they have been transmitted through the first and second voice paths to determine a differential delay in transmission times between the first and second paths; and synchronizing the parallel streams of voice data based on the determined differential delay and then terminating the first voice path.

In another aspect, the present application describes a telephone enabled mobile electronic device that comprises a wireless wide area network (WAN) communications subsystem for exchanging voice data with a wireless wide are network (WAN); a wireless local area network (WLAN) communications subsystem for exchanging voice data with a wireless local area network (WLAN); a speaker; a microphone; and a phone interface for receiving data from the microphone and converting the microphone data into digital voice data and for receiving digital voice data for the speaker and converting the digital voice data into data for output by the speaker. The device also comprises a handoff synchronizer connected to the phone interface, the WAN communications subsystem and the WLAN communications subsystem for synchronizing a handoff of an in-progress voice call between the mobile device and a terminal end point. The handoff synchronizer comprises (i) comparator means for comparing streams of voice data received simultaneously by the WAN communications subsystem and the WLAN communications subsystem and determining a transmission delay differential between the streams of voice data; and (ii) timing adjustment means (146) responsive to the comparator means for adjusting the timing of at least one of the streams of voice data based on the determined delay differential.

In yet another aspect, the present application describes a synchronizing handoff system for handing off in-progress voice call between a wireless wide area network (WAN) and a wireless local area network (WLAN), the system including a WLAN access point interface for exchanging data with wireless access points in the WLAN 112; a first gateway for exchanging data with the WAN through a communications link; a second gateway for exchanging data with a terminal end point over a further communications link; and a handoff synchronizer connected to the second gateway, the access point interface and the first gateway for synchronizing a handoff of an in-progress voice call in which a communications path is established between a mobile device and a terminal end point. The handoff synchronizer comprises: (i) comparator means for comparing a stream of voice data from the mobile device received through the AP Interface and a stream of voice data from the mobile device received through the first gateway and determining a transmission delay differential between the streams of voice data; (ii) timing adjustment means responsive to the comparator means for adjusting the timing of at least one of the streams of voice data based on the determined delay differential; and (iii) switch means for disconnecting the second gateway from one of the AP interface and the first gateway and connecting the second gateway to the other one of the AP interface and the first gateway upon completion of the timing adjustment.

Referring first to FIG. 1, there is a block diagram of a communication system 100 according to at least one example embodiment of the present invention. The communication system 100 includes mobile electronic devices 10 (only one of which is shown in FIG. 1), a wireless wide area network (WAN) 110, a wireless local area network (WLAN) 112, and a wired enterprise network 114.

WLAN 112 in at least some example embodiments conforms to IEEE 802.11 standards, for example 802.11b and/or 802.11g, however other communications protocols could also be used for WLAN 112. As known in the art, WLAN 112 includes a plurality of wireless radio frequency (RF) access points (AP) 116 (two of which are shown in FIG. 1) that collectively provide a WLAN coverage area. In an example embodiment, WLAN 112 is operated by an enterprise (such as a business or university, for example) and access points 116 are connected to a wired enterprise network 114 through an access point interface 118. The AP interface 118 co-ordinates handoffs between access points 116 and acts as the interface between the wired enterprise network 114 and the WLAN 112. The AP interface 118 may be implemented by a computer such as a server running a suitable software program. At least some of the access points 116 of WLAN 112 are trigger access points located at the outer boundary of the WLAN 112 that provide the AP interface 114 with an indication that a mobile device is entering into or is potentially leaving the WLAN 112.

WAN 110 in at least some example embodiments is a packet or non-packet based cellular network that supports voice calls and includes a plurality of base stations 120 (two of which are shown in FIG. 1) that each provide wireless RF coverage to a corresponding area or cell. As known in the art, base stations 120 are each connected to a central office (CO) 122 that is connected to a PSTN (Public Switched Telephone Network). WAN 110 will typically be operated by a cellular network service provider that sells subscription packages to users of mobile devices. WAN 110 could be a number of different types of network including by way of non-limiting example, GSM (Global System for Mobile Communication), GPRS (General Packet Radio System), iDEN (integrated Digital Enhanced Network) or various other third generation networks such as EDGE (Enhanced Data rates for GSM Evolution) or UMTS (Universal Mobile Telecommunications Systems).

Mobile device 10 has the capability to establish voice calls wirelessly over either WAN 110 or WLAN 112, and in this regard includes a WAN communications subsystem 124 for communicating with base stations 120 of WAN 110 and a WLAN communications subsystem 126 for communicating with access points 116 of WLAN 112. WAN 110 and WLAN 112 have coverage areas that at least partially overlap. In at least some example embodiments, the coverage area of WAN 110 is much larger than that of WLAN 112 and may overlap all or a large percentage of the coverage area of WLAN 112. However, WLAN 112 may have sole coverage in some regions that are dead spots in WAN 110, for example, some interior locations of an enterprise's buildings. In example embodiments the mobile device 10 is configured to communicate voice calls over WLAN 112 when within the coverage area of WLAN 112, and over WAN 110 when outside of the coverage area of WLAN 112 and inside the coverage area of WAN 110. Such a configuration may allow, among other things, the mobile device 10 to minimize toll charges to the operator of network 110 and the operators of other networks (including long distance networks) that WAN 110 is connected to; allow the mobile device to take advantage of better local coverage available within the WLAN 112; and/or allow the mobile device to take advantage of better security measures available within the WLAN 112.

In an example embodiment, voice calls made by a mobile device 10 within the WLAN 112 are Voice-over-IP (VoIP) calls in which media sessions are established between the mobile device 10 and a further terminal end point 128 over an IP-based network using real-time transport protocol (RTP) on top of the user datagram protocol (UDP). Session initiation protocol (SIP) or other control protocols may be employed to set-up, manage, control and/or tear down media paths between termination points.

In the example shown in FIG. 1, during a voice call a media path for the session is established between a mobile device 10 located within WLAN 112 and a terminal end point 128 connected to the enterprise network 114 through a communications link 130. The enterprise network 114 includes an IP gateway 132, which may be implemented by a suitably configured server running computer software, acting as the interface between enterprise network 114 and the communications link 130. The communications link 130 may include an IP-network such as the Internet and/or other networks and gateways through which a VoIP session can be established. The terminal end point 128 may be a further VoIP enabled telephone, or may, for example, be a gateway that coverts VoIP data to a format suitable for a local PSTN (public switched telephone network) and/or non-VoIP telephone. The enterprise network 114 includes a handoff synchronizer 134 for selectively connecting IP gateway 132 to the AP interface 118.

Turning now to WAN 110, in at least one example embodiment, the central office 122 of WAN 110 is connected by a communications link 136 to a VoIP gateway 138 of the Enterprise Network 118. VoIP gateway 138 is in turn connected to handoff synchronizer 134. The communications link 136 may include interfaces, gateways, servers, switches and/or networks for routing voice data between WAN 110 and the enterprise network 114. Communications link 136 allows voice data between a terminal end point 128 and a mobile device 10 communicating through WAN 110 to be routed through enterprise network 114. In one example embodiment, WAN subsystem 124 of the mobile device 10 is configured to communicate with WAN 110 using the conventional protocol for WAN 110, and voice data exchanged between VoIP gateway 138 and communications link 136 is in a standard format suitable for transmission over a PSTN. The VoIP gateway 138 coverts data received from the communications link 136 from PSTN to VoIP format and converts data sent over the communications link 136 from VoIP format to PSTN. Formats other than PSTN compatible formats may be used. Thus, in example embodiments, when the mobile device 10 is in a voice session through WAN 110, the VoIP gateway 138 is an RTP terminal end point functioning as a proxy for the mobile device 10. Such a configuration allows the mobile device 10 to take advantage of the VoIP network accessible through enterprise network 114, which for example could allow the enterprise to reduce the toll charges it may otherwise face by routing calls through non-VoIP third party service provider networks. In at least one alternative example embodiment, WAN subsystem 124 of the mobile device 10 is configured to act as a terminal end point in a VoIP session and inserts VoIP packets as payload into data packets sent over WAN 110, with the VoIP packets being extracted by VoIP gateway 138.

According to example embodiments, when a WAN voice session is in progress when the mobile device 10 moves into the coverage area of WLAN 112, the session is handed off from the WAN 110 to the WLAN 112 by handoff synchronizer 134 in the enterprise network 114 switching a connection with IP Gateway 132 from VoIP gateway 138 to AP interface 118. Similarly, when a WLAN voice session is in progress when the mobile device 10 moves out of the coverage area of WLAN 112, the session is handed from the WLAN 112 to WAN 110. The respective delays for voice data packets travelling through WLAN 112 and WAN 110 can in the case of voice media result in a noticeable artefact in the voice stream if the handoff between networks is not properly managed. For example, a relatively small delay difference may result in a "pop" sound, and a larger delay may result in a repeated or missing voice segment. Example embodiments are described herein for addressing quality of service during voice session handoff between a WLAN/cellular network and a WAN. As will be explained in greater detail below, when a hand-off occurs, the connection with both networks is temporarily maintained, the voice data on both connections compared and the timing of the voice stream adjusted to synchronize the voice streams. The voice streams are advanced or retarded to effect synchronization during a make-before-break handoff.

Figure 2:
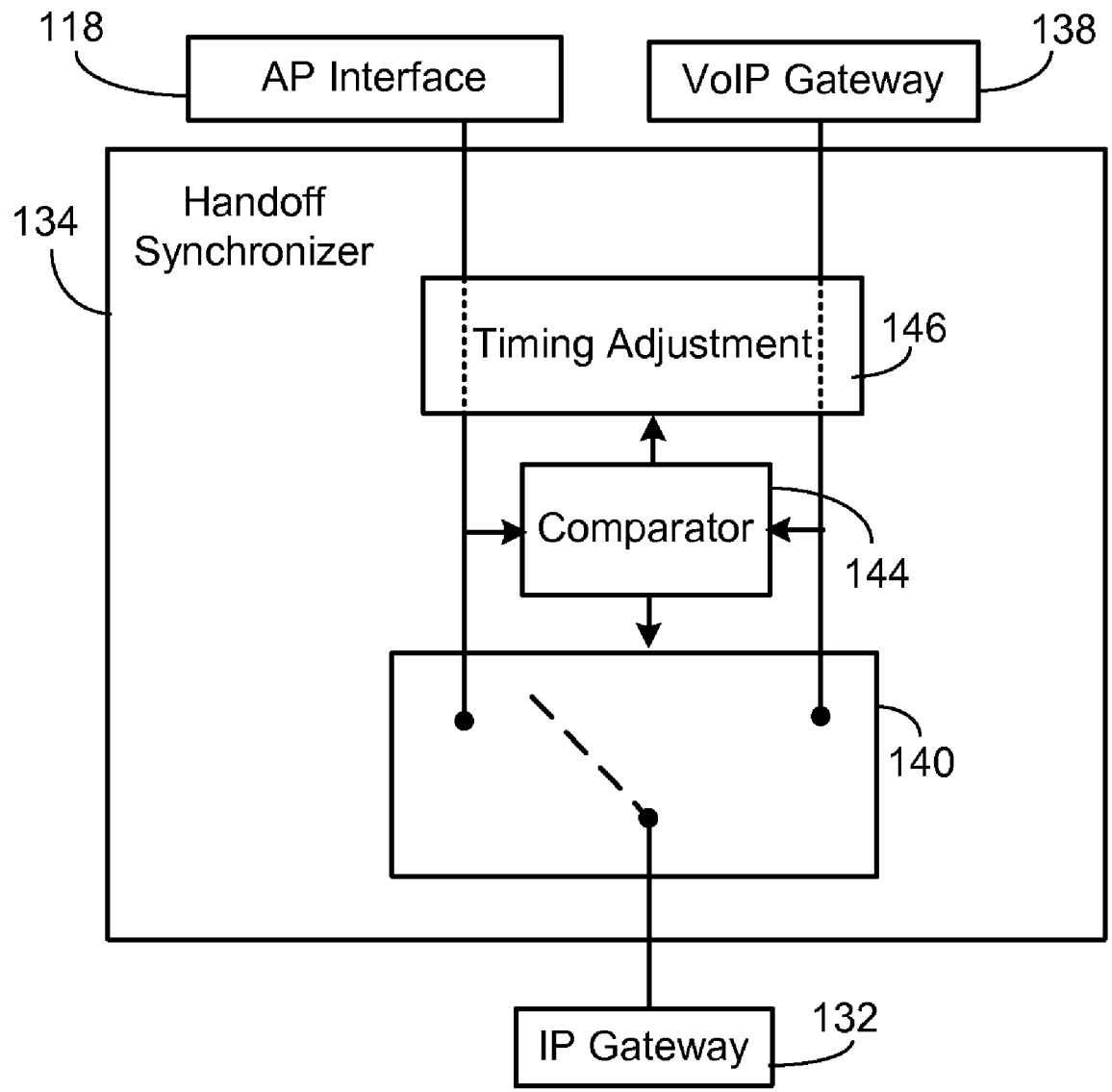
FIG. 2 is a block diagram of a handoff synchronizing system of the communications system of FIG. 1.

In one example embodiment, handoff synchronization is coordinated by a handoff synchronizer 134, which is shown in greater detail in a block diagram form in FIG. 2. The handoff synchronizer 134 may be implemented using a suitably configured computer system running computer software. The handoff synchronizer 134 includes a switch module 140 for selectively connecting VoIP gateway 138 or AP interface 118 to IP gateway 132. The handoff synchronizer 134 also includes a comparator module 144 for comparing, during a handoff-procedure, voice data received in parallel from mobile device 10 over WLAN 112 through AP interface 118 and over WAN 110 and communications link 136 through VoIP gateway 138 and determining the difference in transmission delay in the two paths between the enterprise network 114 and the mobile device 10. A timing adjustment module 146 responsive to comparator module 144 is configured to adjust the timing of the voice data streams coming from WAN 110 and WLAN 112 to account for the differences in transmission delays through the two paths. Once the two streams are synchronized within a predetermined threshold, the comparator 144 causes the switch 140 to switch, completing the handoff.

Figure 3:
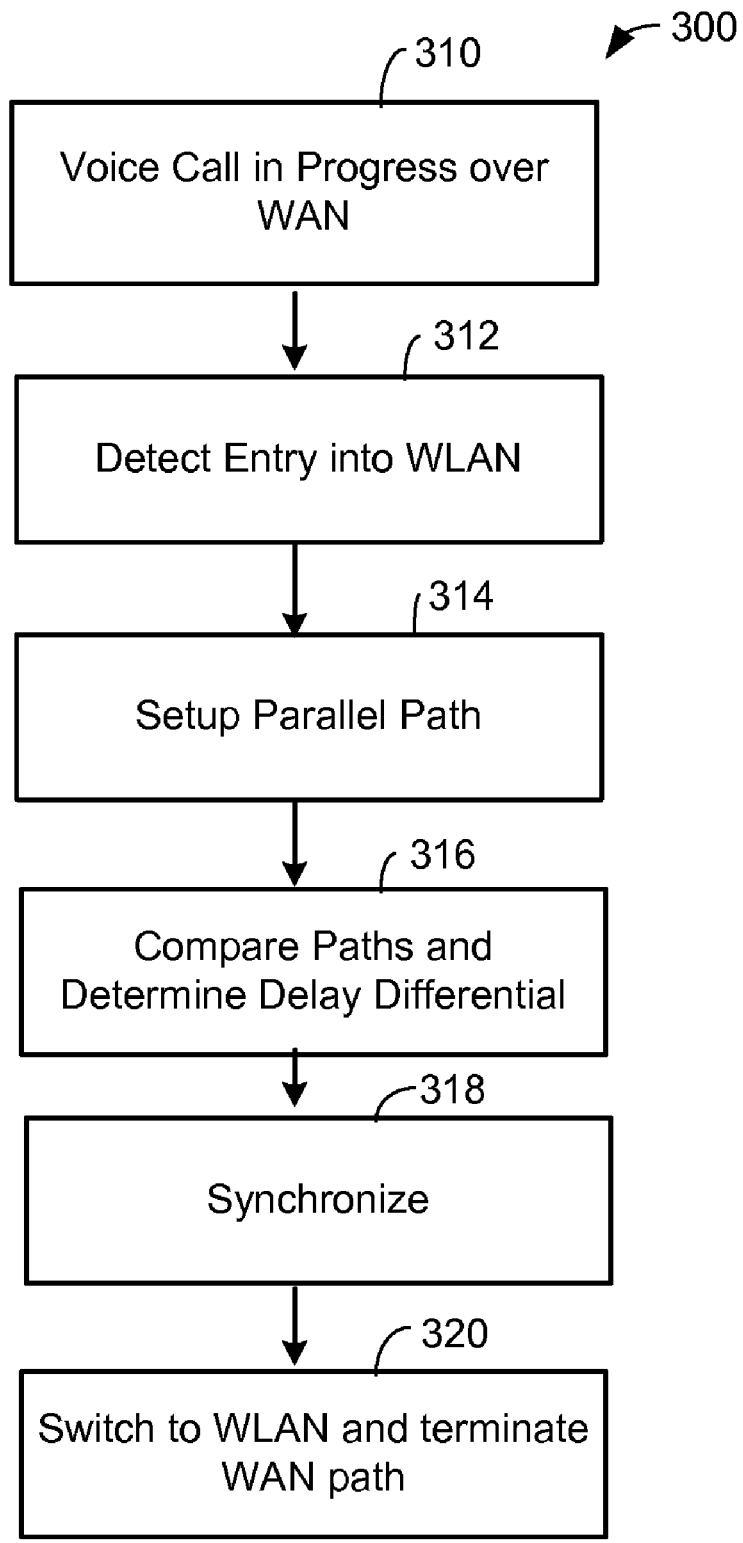
FIG. 3 is a block diagram showing a method for synchronizing handoff between two networks within the communications system of FIG. 1.

An overview having been provided, an example of a handoff from WAN 110 to WLAN 112 when the mobile device 10 moves into the coverage area of WLAN 112 will now be explained in greater detail with reference to FIGS. 1 and 2, and to the flow diagram of FIG. 3 which illustrates an example synchronization handoff procedure 300. Prior to the handoff, the mobile device 10 is outside of the coverage of WLAN 112, and within the coverage of cellular WAN 110. As indicated in step 310, a voice call involving mobile device 10 is in progress over the WAN 110. While the voice call session is established the mobile device 10 transmits through its WAN communications subsystem 124 a stream of voice packets through base stations 120 to the central office 122, which routes the stream of voice packets over communications link 136 to the enterprise network 114 where they are received by VoIP gateway 138. VoIP gateway 138 converts the stream of voice packets into a VoIP compatible format, and sends them via handoff synchronizer 134, IP gateway 132 and communications link 130 to VoIP terminal end point 128, which may among other things be a VoIP enabled telephone or a VoIP gateway that is connected to a non-VoIP enabled telephone device. The WAN communications subsystem 124 of mobile device 10 also receives a stream of voice packets travelling in the opposite direction from the terminal end point 128. In some example embodiments, the terminal end point 128 may be a further mobile device within WLAN 112.

The handoff procedure starts when the mobile device 10 moves into the coverage area of WLAN 112. As indicated in step 312, when the mobile device 10 moves within the coverage are of WLAN 112, a trigger access point 116 of WLAN 112 and the WLAN communications subsystem 124 will begin to exchange information such that the entry of the mobile device 10 into the coverage area is detected. In one example embodiment, the mobile device 10 is configured to recognize when a WAN voice call is in progress and the device enters WLAN 112 coverage area, and advise AP Interface 118. As indicated in step 314, the mobile device 10 and AP interface 118 set up a path for the stream of voice packets from WLAN communications subsystem 126 through to handoff synchronizer 134 such that handoff synchronizer 134 receives over two parallel paths the same stream of voice packets. In other words, once the parallel path is set up, the handoff synchronizer 134 receives via VoIP gateway 138 a stream of voice packets originating from mobile device 10 which are transmitted by WAN communications subsystem 124 over the air to a WAN base station 120, and sent through central office 122 and communications link 136 to enterprise network 114. The handoff synchronizer 134 also receives via AP interface 118 the same stream of voice packets originating from mobile device 10 which are transmitted by WLAN communications subsystem 126 over the air to a WLAN access point 116.

Given the remote location of the handoff synchronizer 134 relative to the mobile device 10, the transmission delays of the WAN originating voice stream and the WLAN originating voice stream will be such that typically there will be a differential in the delay between the two streams of voice data packets at the handoff synchronizer 134. As indicated in step 316, the two voice streams are compared to each other to determine the differential in the delays experienced over their respective communications paths. Such comparison is carried out by comparator module 144 which in one example embodiment cross-correlates the two streams of voice data packets to determine the difference in delays between the two streams.

As indicated in step 318, the calculated delay is then used as a basis for synchronizing the two voice streams prior to completing the handoff. In the illustrated embodiment, synchronization is carried out by the timing adjustment module 146 in response to information received from comparator module 144. Although not necessarily always the case, when handing off from WAN 110 to WLAN 112, the transmission delay (including propagation an processing delays) will typically be greater in the WAN path than the WLAN path. In one example embodiment, the timing adjustment module 146 adjusts the timing of the established voice stream (in this example, the stream passing through WAN) to remove the relative delay between the voice streams. Thus, in the case of a handoff from WAN 110 to WLAN 112, the timing adjustment module 146 adjusts the timing of the voice data stream passing through WAN 110 until the relative delay between the WAN 110 and WLAN 112 voice data steams reaches an acceptable level.

In one example embodiment, in order speed up the stream of voice data, voice stream data representing quiet intervals such as pauses in conversation are detected and cut or shortened by timing adjustment module 146. In order to slow down the stream of voice data, voice stream data representing quiet intervals such as pauses in conversation are detected by timing adjustment module 146 and lengthened. Thus, the timing adjustment module 134 has the ability to manipulate packets carrying voice data to provide the necessary timing adjustments. In at least some example embodiments, the comparator module 144 monitors the two voice data streams output by timing adjustment module 146 during the synchronization step, and when the delay differential meets a predetermined threshold of acceptability that will not affect quality of service, the comparator module 144 causes switch module 140 to switch from the existing network connection (the connection to WAN network in the presently described example) to the network connection that is taking over (the connection to WLAN network in the presently described example), thus completing the handoff (step 320). Once the connection is switched to the AP interface 118 from the VoIP gateway, the path between mobile device WAN communications subsystem 124 through WAN 110 and communications link 136 to VoIP gateway 138 is terminated by WAN communications subsystem 124 and/or VoIP gateway 138, and the voice session is subsequently carried on through an RTP path established between mobile device 10 and terminal end point 128 via WLAN 112, AP interface 118, handoff synchronizer 134, IP gateway 132 and communications Link 130. From the perspective of terminal end point 128, the handoff is substantially unnoticed.

It will be appreciated that streams of voice data packets are going both from mobile device 10 to terminal end point 128, and also in the opposite direction from terminal end point 128 to mobile device 10. In at least one example embodiment, an assumption is made that the delay differences in voice streams travelling at the same time over WAN 110 and over WLAN 112 towards the mobile device will be the same as the delays measured by comparator 144 coming from the mobile device. Accordingly, in step 318, the voice stream going to the mobile device 10 is synchronized using the same timing adjustments applied to the voice stream coming from the mobile device 10.

Figure 4:
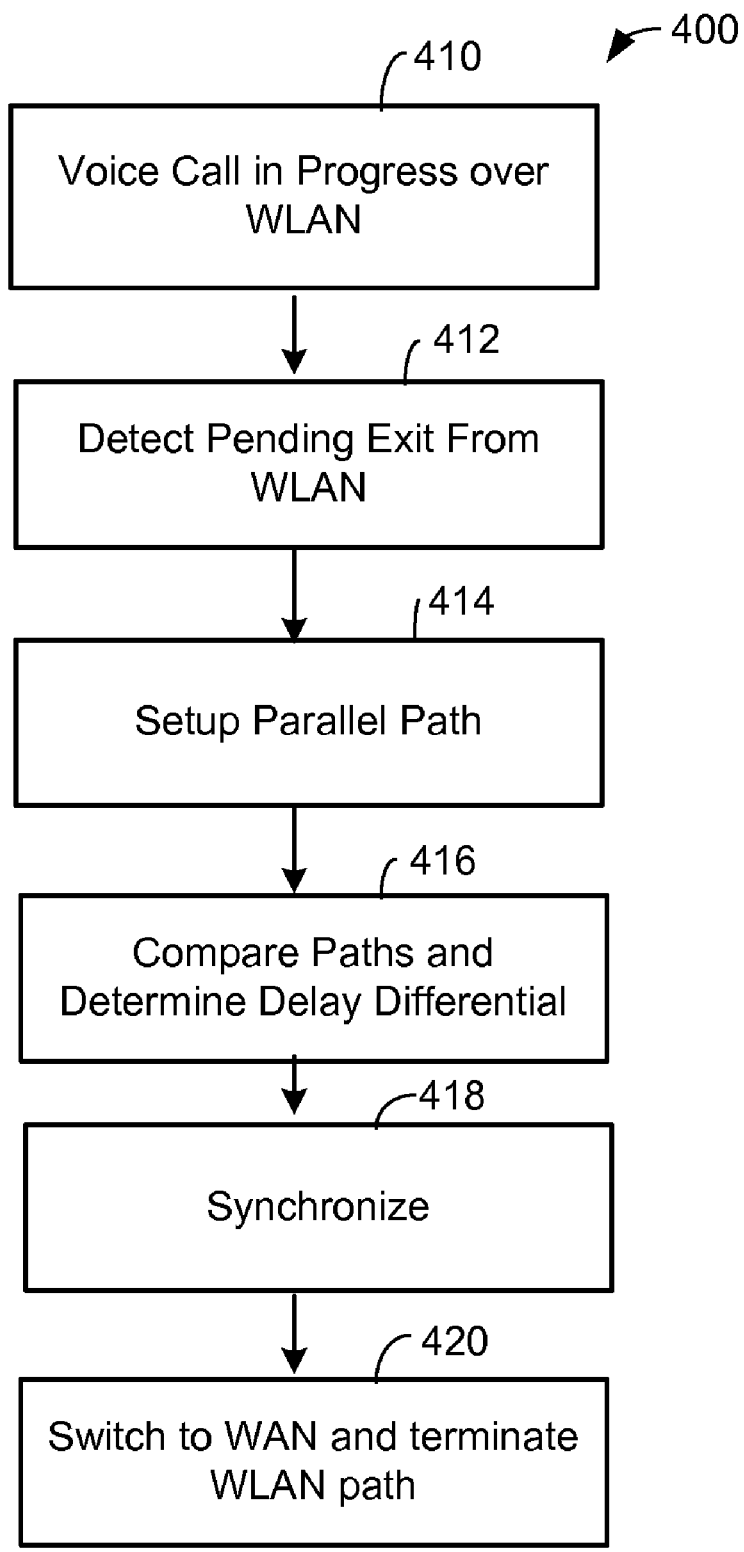
FIG. 4 is a block diagram showing a further method for synchronizing handoff between two networks within the communications system of FIG. 1.

With reference to FIG. 4, an example of a handoff procedure 400 from WLAN 112 to WAN 110 when mobile device 10 moves out of the coverage area of WLAN 112 will now be explained in greater detail. Prior to the handoff, the mobile device 10 is inside the coverage area of WLAN 112. As indicated in step 410, a VoIP voice call involving mobile device 10 is in progress over the WLAN 110. While the voice call session is established the mobile device 10 transmits through its WLAN communications subsystem 126 a stream of voice packets through one or more base access points 116 to the AP interface 118, from which the stream of voice packets are routed through handoff synchronizer 134, IP gateway 132 and communications link 130 to VoIP terminal end point 128, which may among other things be a VoIP enabled telephone or a VoIP gateway that is connected to a non-VoIP enabled telephone device. The WLAN communications subsystem 126 of mobile device 10 also receives a stream of voice packets travelling in the opposite direction from the terminal end point 128. In some example embodiments, the terminal end point 128 may be a further mobile device within WLAN 112.

The handoff procedure starts when movement of the mobile device 10 out of the coverage area of WLAN 112 is detected. As indicated in step 412, when the mobile device 10 moves close to the boundary of WLAN 112, communication with a trigger access point 116 of WLAN 112 indicates that movement of the device out of the coverage area of WLAN 112 in the near future is likely. As indicated in step 314, when the potential exit form WLAN coverage area is detected, the mobile device 10 will cause its WAN communications subsystem 124 to set up with WAN 110 a path for the stream of voice packets from WAN communications subsystem 124 through WAN 110, central office 122, communications link 136 and VoIP gateway 138 to handoff synchronizer 134, such that handoff synchronizer 134 receives over two parallel paths the same stream of voice packets.

The transmission delay of the WAN originating voice stream and the WLAN originating voice stream will be such that typically there will be a differential in the delay between the two streams of voice data packets at the handoff synchronizer 134. As indicated in step 416, the two voice streams are compared to each other to determine the differential in the delays experienced over their respective communications paths. Such comparison is carried out by comparator module 144, as indicated above.

As indicated in step 418, the calculated delay is then used as a basis for synchronizing the two voice streams prior to completing the handoff. In one example embodiment, the timing adjustment module adjusts the timing of the established voice stream (in this example, the stream passing through WLAN 112) to remove the relative delay between the voice streams. Thus, in the case of a handoff to WAN 110 from WLAN 112, the timing adjustment module 146 adjusts the timing of the voice data stream passing through WLAN 112 until the relative delay between the WAN 110 and WLAN 112 voice data steams reaches an acceptable level.

In at least some example embodiments, the comparator module 144 monitors the two voice data streams output by timing adjustment module 146 during the synchronization step, and when the delay differential meets a predetermined threshold of acceptability that will not affect quality of service, the comparator module 144 causes switch module 140 to switch from the existing network connection (the connection to WLAN 112 in the presently described example) to the network connection that is taking over (the connection to WAN 110 in the presently described example), thus completing the handoff (step 420). Once the connection is switched from the AP interface 118 to the VoIP gateway 138, the path between mobile device WLAN communications subsystem 126 through WLAN 112 is terminated by WLAN communications subsystem 126 and/or AP interface 118, and the voice session is subsequently carried on through a path established between mobile device 10 and terminal end point 128 via WAN 110, central office 122, communications link 136, VoIP gateway 138, handoff synchronizer 134, IP gateway 132 and communications Link 130. From the perspective of terminal end point 128, the handoff is substantially unnoticed. As indicated above, streams of voice data packets are going both from mobile device 10 to terminal end point 128, and also in the opposite direction from terminal end point 128 to mobile device 10. In at least one example embodiment, an assumption is made that the delay differences in voice streams travelling at the same time over WAN 110 and over WLAN 112 towards the mobile device will be the same as the delays measured by comparator 144 coming from the mobile device. Accordingly, in step 418, the voice stream going to the mobile device 10 is synchronized using the same timing adjustments applied to the voice stream coming from the mobile device 10.

In the example described above, the voice stream established prior to the handoff is adjusted to remove the relative delay. In some alternative example embodiments the timing of both voice streams may be adjusted, or the timing of just the new voice stream may be adjusted to achieve synchronization.

Figure 5:
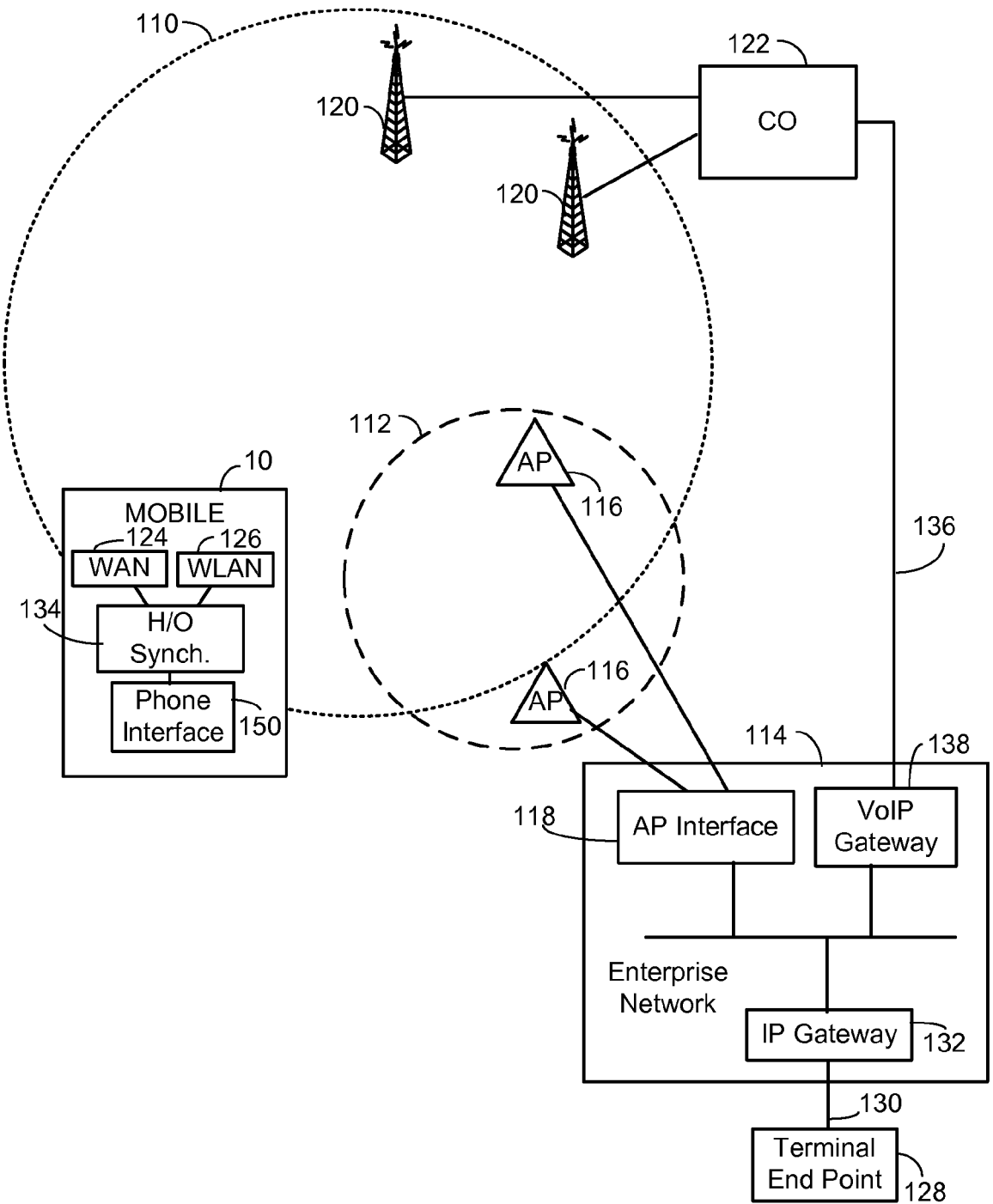
FIG. 5 is a block diagram of a communications system incorporating further example embodiments.

In the embodiments described above, the handoff synchronizer 134 has been illustrated as being part of enterprise network 114, which is remotely located from the mobile device 10. However, in other example embodiments, handoff synchronizer 134 may be located at other locations in the communications system 100 where two voice paths potentially converge. For example, handoff synchronizer 134 could be located in the mobile electronic device 10, and in this regard FIG. 5 shows a further example embodiment in which handoff synchronizer 134 is located within mobile device 10. When located in mobile device 10, the handoff synchronizer 134 selectively connects a phone interface 150 of the mobile device 10 to either the WAN communications subsystem 124 or the WLAN communications subsystem 126. The phone interface 150 converts the stream of voice data received from WAN communications subsystem 124 or WLAN communications subsystem 126 into a format so that it can be applied to a speaker of the mobile device 10. Similarly, the phone interface 150 converts voice data received from a microphone of the mobile device 10 into a digital format for WAN communications subsystem 124 or WLAN communications subsystem 126. The handoff synchronizer 134 may in some example embodiments be implemented by software executed by a processor on the mobile device 10. The phone interface 150 may have components implemented by a software executed by a processor on the mobile device and/or hardware.

Figure 6:
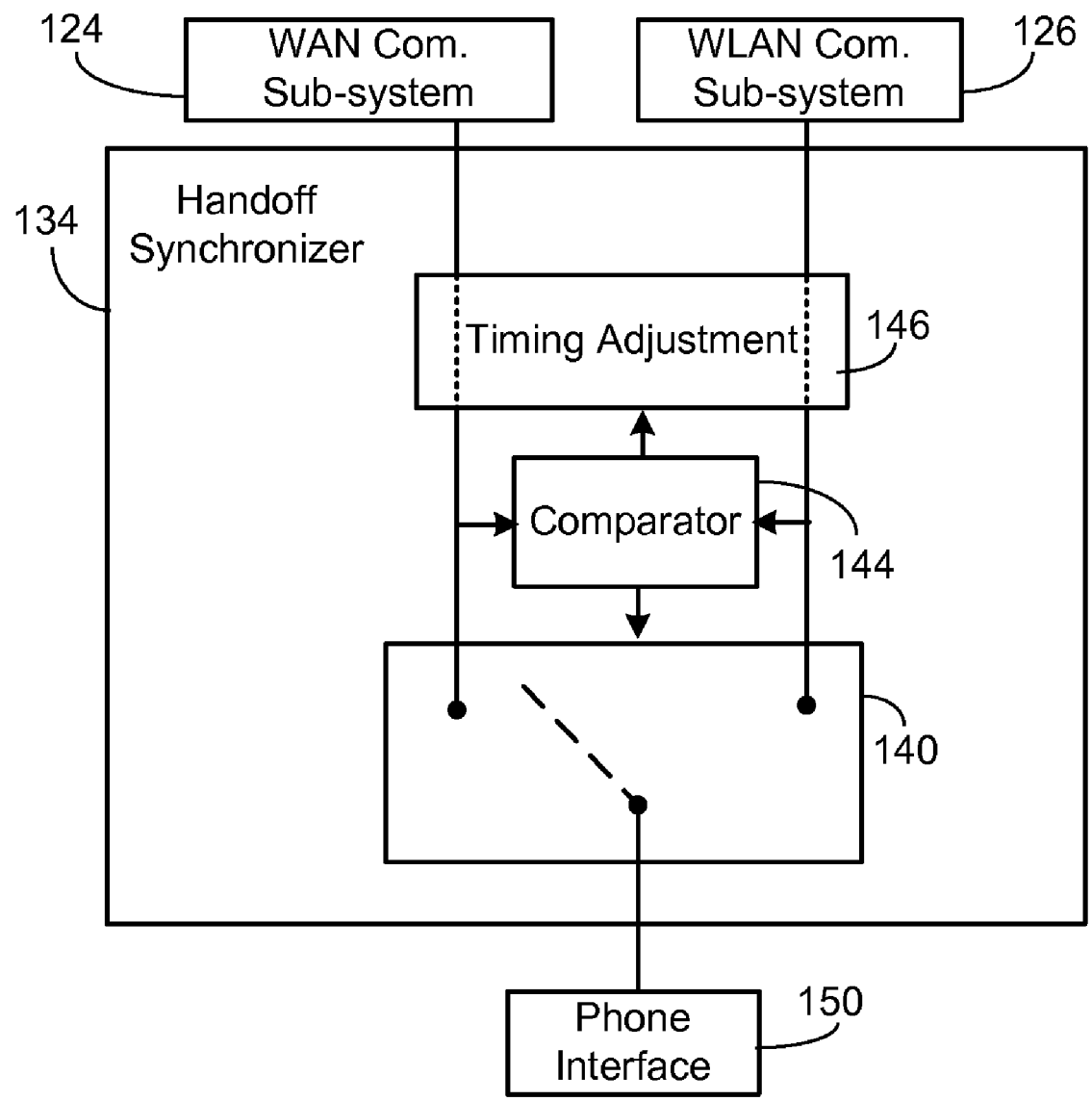
FIG. 6 is a block diagram of a hand off synchronizer in a mobile electronic device of the communications system of FIG. 5.

FIG. 6 shows the handoff synchronizer 134 as located in mobile device 10. The synchronizer 134 has a similar configuration as when located in the enterprise network 114, except that it is connected to WAN communications subsystem 124, WLAN communications subsystem 126, and phone interface 150, rather than to the AP Interface 118, VoIP Gateway 138 and IP gateway 132. The procedure for handing off to and from WLAN 112 are similar to those described above and will be briefly described with reference to FIGS. 3-6. Firstly, an example of a handoff from WAN 110 to WLAN 112 when a mobile device having an onboard handoff synchronizer 134 moves into the coverage area of WLAN 112 will now be explained in greater detail with reference to FIGS. 5 and 6, and to the flow diagram of FIG. 3. Prior to the handoff, the mobile device 10 is outside of the coverage of WLAN 112, and within the coverage of cellular WAN 110. As indicated in step 310, a voice call involving mobile device 10 is in progress over the WAN 110. While the voice call session is established the mobile device 10 transmits through its WAN communications subsystem 124 a stream of voice packets through one or more base stations 120 to the central office 122, which routes the stream of voice packets over communications link 136 to the enterprise network 114 where they are received by VoIP gateway 138. VoIP gateway 138 converts the stream of voice packets into a VoIP compatible format, and sends them via IP gateway 132 and communications link 130 to VoIP terminal end point 128. The WAN communications subsystem 124 of mobile device 10 also receives a stream of voice packets travelling in the opposite direction from the terminal end point 128.

The handoff procedure starts when the mobile device 10 moves into the coverage area of WLAN 112. As indicated in step 312, when the mobile device 10 moves within the coverage are of WLAN 112, a trigger access point 116 of WLAN 112 and the WLAN communications subsystem 124 will begin to exchange information such that the entry of the mobile device 10 into the coverage area is detected. In one example embodiment, the mobile device 10 is configured to recognize when a WAN voice call is in progress and the device enters WLAN 112 coverage area, and advise AP Interface 118 that a voice call over WAN 110 is already in progress. This information is passed on to IP gateway 132, and as indicated in step 314, the mobile device 10 and AP interface 118, and IP gateway 132 set up a path for voice packets such that a copy of the voice stream originating with terminal end point 128 is sent by IP gateway 132 to AP Interface and over WLAN 112 to the WLAN communications subsystem of mobile device 10. In other words, a parallel path from the enterprise network 114 to the mobile phone device 10 through WLAN 112 is set up in addition to the existing path through communications link 136 and WAN 110.

The mobile device resident handoff synchronizer 134 receives via WAN communications subsystem 124 a stream of voice packets originating from terminal end point 128 which are sent through communications link 130, enterprise network 114, communications link 136, central office 122 and then transmitted to WAN communications subsystem 124 over the air from a WAN base station 120. At the same time the handoff synchronizer 134 receives via AP interface 118 the same stream of voice packets which are transmitted by WLAN access point 116 over the air to WLAN communications subsystem 126. In other words, a parallel path from the enterprise network 114 to the mobile phone device 10 through WLAN 112 is set up in addition to the existing path through communications link 136 and WAN 110.

The transmission delay of the WAN voice stream and the WLAN voice stream will be such that typically there will be a differential in the delay between the two streams of voice data packets at the handoff synchronizer 134. As indicated in step 316, the two voice streams are compared to each other to determine the differential in the delays experienced over their respective communications paths. Such comparison is carried out by comparator module 144 which in one example embodiment cross-correlates the two streams of voice data packets to determine the difference in delays between the two streams.

As indicated in step 318, the calculated delay is then used as a basis for synchronizing the two voice streams prior to completing the handoff. In the illustrated embodiment, synchronization is carried out by the timing adjustment module 146 in response to information received from comparator module 144. Although not necessarily always the case, when handing off from WAN 110 to WLAN 112, the transmission delay will typically be greater in the WAN path than the WLAN path. In one example embodiment, the timing adjustment adjusts the timing of the established voice stream (in this example, the stream passing through WAN) to remove the relative delay between the voice streams. Thus, in the case of a handoff from WAN 110 to WLAN 112, the timing adjustment module 146 adjusts the timing of the voice data stream passing through WAN 110 until the relative delay between the WAN 110 and WLAN 112 voice data steams reaches an acceptable level.

In one example embodiment, in order speed up the stream of voice data, voice stream data representing quiet intervals such as pauses in conversation are detected and cut or shortened by timing adjustment module 146. In order to slow down the stream of voice data, voice stream data representing quiet intervals such as pauses in conversation are detected by timing adjustment module 146 and lengthened. Thus, the timing adjustment module 134 has the ability to manipulate packets carrying voice data to provide the necessary timing adjustments. In at least some example embodiments, the comparator module 144 monitors the two voice data streams output by timing adjustment module 146 during the synchronization step, and when the delay differential meets a predetermined threshold of acceptability that will not affect quality of service, the comparator module 144 causes switch module 140 to switch from the existing network connection (the connection to WAN network in the presently described example) to the network connection that is taking over (the connection to WLAN network in the presently described example), thus completing the handoff (step 320). Once the connection is switched to WLAN communications subsystem 126, the path between mobile device WAN communications subsystem 124 through WAN 110 and communications link 136 to VoIP gateway 138 is terminated by WAN communications subsystem 124 and/or VoIP gateway 138, and the voice session is subsequently carried on through an RTP path established between mobile device 10 and terminal end point 128 via WLAN 112, AP interface 118, handoff synchronizer 134, IP gateway 132 and communications Link 130.

It will be appreciated that streams of voice data packets are going both from mobile device 10 to terminal end point 128, and also in the opposite direction from terminal end point 128 to mobile device 10. In the example where the handoff synchronizer is located at mobile device 10, it will be the voice data packets that are received by the mobile device 10 that will be compared. In at least one example embodiment, an assumption is made that the delay differences in voice streams travelling at the same time over WAN 110 and over WLAN 112 away from the mobile device will be the same as the delays measured by comparator 144 in packets coming to the mobile device. Accordingly, in step 318, the voice stream transmitted from the mobile device 10 is synchronized using the same timing adjustments applied to the voice stream arriving at the mobile device 10.

With reference to FIGS. 4, 5 and 6 an example of a handoff procedure 400 from WLAN 112 to WAN 110 when handoff synchronzier equipped mobile device 10 moves out of the coverage area of WLAN 112 will now be explained in greater detail. Prior to the handoff, the mobile device 10 is inside the coverage area of WLAN 112. As indicated in step 410, a VoIP voice call involving mobile device 10 is in progress over the WLAN 110. While the voice call session is established the mobile device 10 transmits through its WLAN communications subsystem 126 a stream of voice packets through one or more base access points 116 to the AP interface 118, from which the stream of voice packets are routed through IP gateway 132 and communications link 130 to VoIP terminal end point 128, which may among other things be a VoIP enabled telephone or a VoIP gateway that is connected to a non-VoIP enabled telephone device. The WLAN communications subsystem 126 of mobile device 10 also receives a stream of voice packets travelling in the opposite direction from the terminal end point 128.

The handoff procedure starts when movement of the mobile device 10 out of the coverage area of WLAN 112 is detected. As indicated in step 412, when the mobile device 10 moves close to the boundary of WLAN 112, communication with a trigger access point 116 of WLAN 112 indicates that movement of the device out of the coverage area of WLAN 112 in the near future is likely. As indicated in step 314, when the potential exit form WLAN coverage area is detected, the mobile device 10 will cause its WAN communications subsystem 124 to set up with WAN 110 and VoIP gateway 138 an alternate path for the stream of voice packets from terminal end point 128. Thus, parallel paths are established between enterprise network 114 and the mobile device 10, one path including the existing path through WLAN 112, the other path including a new path through WAN 110.

The transmission delay of the WAN voice stream and the WLAN voice stream will be such that typically there will be a differential in the delay between the two streams of voice data packets at the handoff synchronizer 134. As indicated in step 416, the two voice streams are compared to each other to determine the differential in the delays experienced over their respective communications paths. Such comparison is carried out by comparator module 144, as indicated above.

As indicated in step 418, the calculated delay is then used as a basis for synchronizing the two voice streams prior to completing the handoff. In one example embodiment, the timing adjustment module 146 adjusts the timing of the established voice stream (in this example, the stream passing through WLAN 112) to remove the relative delay between the voice streams. Thus, in the case of a handoff to WAN 110 from WLAN 112, the timing adjustment module 146 adjusts the timing of the voice data stream passing through WLAN 112 until the relative delay between the WAN 110 and WLAN 112 voice data steams reaches an acceptable level.

In at least some example embodiments, the comparator module 144 monitors the two voice data streams output by timing adjustment module 146 during the synchronization step, and when the delay differential meets a predetermined threshold of acceptability that will not affect quality of service, the comparator module 144 causes switch module 140 to switch the phone interface 150 from the existing network connection (the connection through WLAN communications subsystem 126 in the presently described example) to the network connection that is taking over (the connection through WAN communication subsystem 124 in the presently described example), thus completing the handoff (step 420). Once the connection is switched from WLAN communications subsystem 126 to WLAN communications subsystem 124, the path between mobile device WLAN communications subsystem 126 through WLAN 112 is terminated by WLAN communications subsystem 126 and/or AP interface 118, and the voice session is subsequently carried on through a path established between mobile device 10 and terminal end point 128 via WAN 110, central office 122, communications link 136, VoIP gateway 138, IP gateway 132 and communications Link 130. As indicated above, streams of voice data packets are going both from mobile device 10 to terminal end point 128, and also in the opposite direction from terminal end point 128 to mobile device 10. In at least one example embodiment, an assumption is made that the delay differences in voice streams travelling at the same time over WAN 110 and over WLAN 112 away from the mobile device will be the same as the delays measured by comparator 144 in voice streams arriving at the mobile device. Accordingly, in step 418, the voice stream being transmitted from the mobile device 10 is synchronized using the same timing adjustments applied to the voice stream being received at the mobile device 10. In the example described above, the voice stream established prior to the handoff is adjusted to remove the relative delay. In some alternative example embodiments the timing of both voice streams may be adjusted, or the timing of just the new voice stream may be adjusted to achieve synchronization.

In the embodiment of FIG. 5, a switching function for switching the IP Gateway 132 between the AP Interface 118 and the VoIP Gateway 138 may also be included at the enterprise network 114. In some embodiments, the switch 140 may be located at the at the enterprise network 114, with the timing adjustment module 146 being located at the mobile device 10.

In one example embodiment, mobile electronic devices 10 are hand-held two-way mobile communication devices 10 having at least voice communication and possible also data communication capabilities. In an example embodiment, the devices 10 have the capability to communicate with other computer systems on the Internet. In various embodiments, mobile electronic devices 10 may include, by way of non limiting example, multiple-mode communication devices configured for both data and voice communication, mobile telephones, and PDAs enabled for wireless phone communications. In the presently described embodiment, the mobile electronic device 10 is configured to operate within the wireless WAN 110 and WLAN 112.

Figure 7:
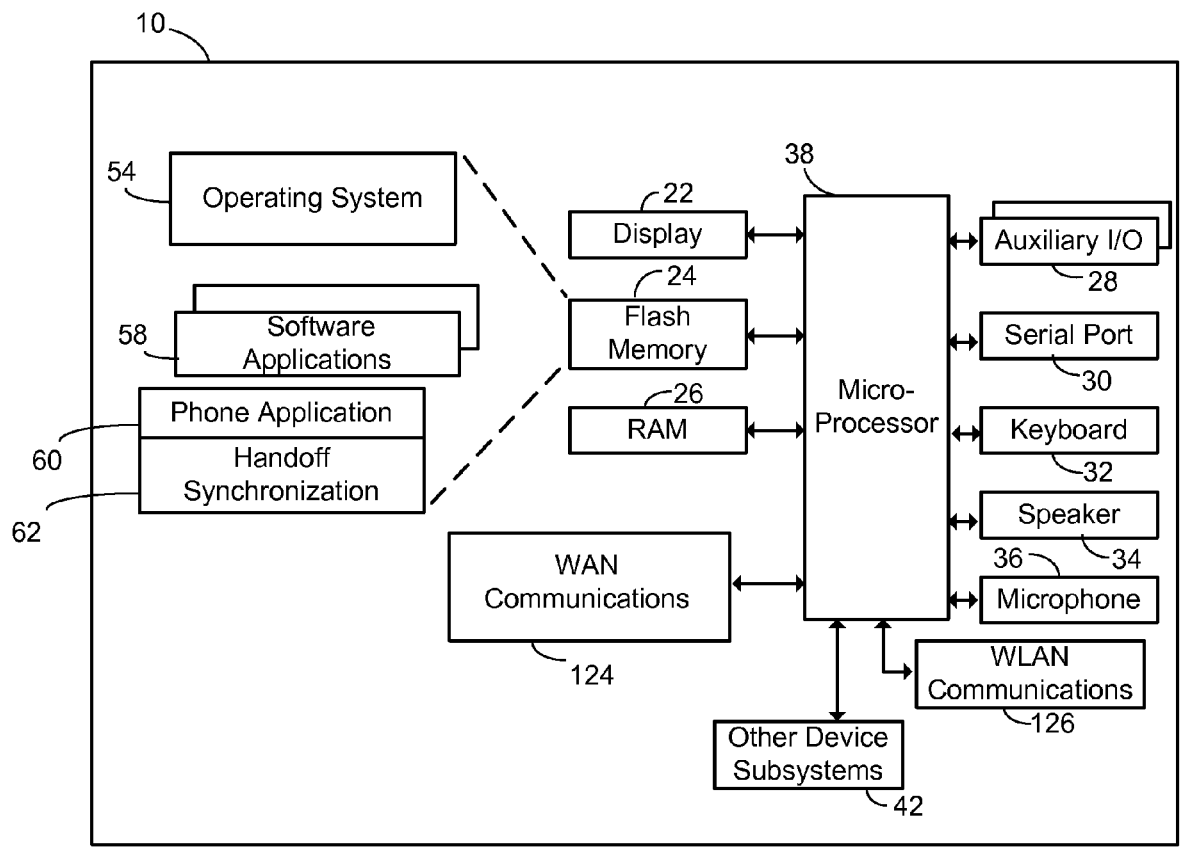
FIG. 7 is a block diagram showing an example of a mobile electronic device that can be used in the communications systems of FIGS. 1 and 5.

An example of a mobile electronic device 10 with which at least some embodiments of the invention may be used is shown in FIG. 7. As indicated above, the device 10 includes wireless WAN communication subsystem 124 for two-way communications with wireless WAN 110 and a WLAN communication subsystem 126 for two way communications with WLAN 112. Communications subsystems 124 and 126 include RF transceivers and may also include signal processor such as DSPs for example. The device 10 includes a microprocessor 38 that controls the overall operation of the device. The microprocessor 38 interacts with communications subsystems 124 and 126 and also interacts with further device subsystems such as the display 22, flash memory 24, random access memory (RAM) 26, auxiliary input/output (I/O) subsystems 28 (which may include a thumb-wheel, for example), serial port 30 (which may include a USB port, for example), keyboard or keypad 32, speaker 34, microphone 36, and any other device subsystems generally designated as 42.

Operating system software 54 and various software applications 58 used by the microprocessor 38 are, in one example embodiment, stored in a persistent store such as flash memory 24 or similar storage element. Software applications 58 may include a wide range of applications, including an address book application, a messaging application, a calendar application, and/or a notepad application. One application included among applications 58 is telephone application 60 for enabling the mobile device 10 to function as a mobile phone. Among other things, the phone application includes the computer instructions for implementing phone interface 150, and in embodiments where the handoff synchroniser 134 is present on mobile device 10, the computer instructions for implementing the handoff synchronizer 134 may be a part of phone application 60 or may be a separate application 62. Each software application 58 may include layout information defining the placement of particular fields in the user interface for the software application 58, such as text fields, input fields, etc. Those skilled in the art will appreciate that the operating system 54, specific device applications 58, or parts thereof, may be temporarily loaded into a volatile store such as RAM 26. Received communication signals may also be stored to RAM 26.

The microprocessor 38, in addition to its operating system functions, enables execution of software applications 58 (which can include software applications 60 and 62) on the device. A predetermined set of applications 58 which control basic device operations, including at least data and voice communication applications for example, will normally be installed on the device 10 during manufacture. Further applications may also be loaded onto the device 10 through the network 110, an auxiliary I/O subsystem 28, serial port 30, communications subsystem 124, 126 or any other suitable subsystem 42, and installed by a user in the RAM 26 or a non-volatile store for execution by the microprocessor 38.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for handing off an in-progress call in a communications system that comprises a wireless wide area network (WAN) and a wireless local area network (WLAN) having at least partially overlapping coverage areas, a mobile device having a WAN communications subsystem for exchanging wireless voice data with the WAN and a WLAN communications subsystem for exchanging wireless voice data with the WLAN, wherein prior to handoff a communications path between the mobile device and a remote location Comprises a first voice path through one of the WAN and the WLAN, the handoff method comprising:
establishing a second voice path between the mobile device and the remote location through the other one of the WAN and the WLAN;
transmitting in parallel streams of identical voice data over the first and second voice paths;
comparing the streams of voice data after they have been transmitted through the first and second voice paths to determine a differential delay in transmission times between the first and second paths; and
synchronizing the parallel streams of voice data by adjusting the timing of at least one of the streams of voice data until the determined differential delay reaches a predetermined threshold and then terminating the first voice path.

2. The method of claim 1 wherein synchronising the parallel streams comprises increasing or decreasing a duration of the voice data transmitted over the first path by adding time to or cutting time from, respectively, quiet intervals in the voice data.

3. The method of claim 1 wherein a terminal end point is connected by a communications link to the remote location, wherein prior to the termination of the first voice path the mobile device and the terminal end point exchange voice data through the first voice path and the communications link, and subsequent to termination of the first voice path the mobile device and the terminal end point exchange voice data through the second voice path and the communications link.

4. The method of claim 3 wherein the communications link comprises an Internet Protocol network, the voice data exchanged between the remote location and the terminal endpoint being in a Voice over Internet Protocol compatible format.

5. The method of claim 3 wherein the comparing and synchronizing steps are performed at the remote location, the streams of voice data originating at the mobile device.

6. The method of claim 3 wherein the comparing and synchronizing steps are performed at the mobile device, the streams of voice data being transmitted over the first and second path from the remote location.

7. The method of claim 1 wherein the WAN comprises a cellular network compatible with at least one of GSM (Global System for Mobile Communication), GPRS (General Packet Radio System), iDEN (integrated Digital Enhanced Network), EDGE (Enhanced Data rates for GSM Evolution) and UMTS (Universal Mobile Telecommunications Systems).

8. The method of claim 1 wherein the WLAN is compatible with IEEE 802.11.

9. A mobile electronic device comprising
a wireless wide area network (WAN) communications subsystem for exchanging voice data with a wireless wide area network (WAN);
a wireless local area network (WLAN) communications subsystem for exchanging voice data with a wireless local area network (WLAN);
a speaker;
a microphone;
an interface adapted to:
receive microphone data from the microphone;
convert the microphone data into microphone digital voice data;
receive speaker digital voice data for the speaker; and
convert the speaker digital voice data into data for output by the speaker;
and
a handoff synchronizer connected to the interface, the WAN communications subsystem and the WLAN communications subsystem the handoff synchronizer adapted to synchronize a handoff of an in-progress voice call between the mobile device and a terminal end point, the handoff synchronizer including:
(i) a comparator module adapted to
compare streams of voice data received simultaneously by the WAN communications subsystem and the WLAN communications subsystem; and
determine a transmission delay differential between the streams of voice data; and
(ii) a timing adjustment module, responsive to the comparator module, adapted to;
adjust the timing of at least one of the streams of voice data until the comparator module determines that the determined transmission delay differential reaches a predetermined threshold.

10. The mobile electronic device of claim 9 wherein the handoff synchronizer further comprises a switch module adapted to disconnect the interface from one of the WAN communications subsystem and the WLAN communication subsystem and connect the interface to the other one of the WAN communications subsystem and the WLAN communication subsystem upon being caused to do so by the comparator module.

11. The mobile electronic device of claim 9 wherein the timing adjustment module is configured to adjust the timing of the at least one of the streams of voice data by increasing or decreasing a duration thereof by adding time to or cutting time from, respectively, quiet intervals in the voice data.

12. The mobile electronic device of claim 9 wherein the WAN communications subsystem is configured to communicate with a cellular network compatible with at least one of GSM (Global System for Mobile Communication), GPRS (General Packet Radio System), iDEN (integrated Digital Enhanced Network), EDGE (Enhanced Data rates for GSM Evolution) and UMTS (Universal Mobile Telecommunications Systems).

13. The mobile electronic device of claim 9 wherein the WLAN communications subsystem is configured to communicate with an IEEE 802.11 compatible WLAN.

14. A synchronizing handoff system for handing off in-progress voice call between a wireless wide area network (WAN) and a wireless local area network (WLAN), the system including:
a WLAN access point interface adapted to exchange data with wireless access points in the WLAN;
a first gateway adapted to exchange data with the WAN through a communications link;
a second gateway adapted to exchange data with a terminal end point over a further communications link; and
a handoff synchronizer connected to the second gateway, the WLAN access point interface and the first gateway the handoff synchronizer adapted to synchronize a handoff of an in-progress voice call in which a communications path is established between a mobile device and a terminal end point, the handoff synchronizer including:
(i) a comparator module adapted to:
compare a stream of voice data from the mobile device received through the WLAN access point interface and a stream of voice data from the mobile device received through the first gateway; and
determine a transmission delay differential between the streams of voice data;
(ii) a timing adjustment means module, responsive to the comparator module, adapted to
adjust the timing of at least one of the streams of voice data until the comparator module determines that the determined transmission delay differential reaches a predetermined threshold; and
(iii) a switch module adapted to disconnect the second gateway from one of the WLAN access point interface and the first gateway and connect the second gateway to the other one of the WLAN access point interface and the first gateway upon being caused to do so by the comparator module.

15. The system of claim 14 wherein the timing adjustment module is configured to adjust the timing of the at least one of the streams of voice data by increasing or decreasing a duration thereof by adding time to or cutting time from, respectively, quiet intervals in the voice data.

16. The system of claim 14 wherein the second communications link comprises an Internet Protocol network, the second gateway being configured to exchange Voice over Internet Protocol format voice data with the terminal end point.

17. The system of claim 14 wherein the first gateway is a Voice over Internet Protocol gateway configured to convert Public Switched Telephone Network format voice data received over the first communications link to Voice over Internet Protocol format voice data.

* * * * *